US007415503B2

(12) United States Patent
Chernoguzov

(10) Patent No.: US 7,415,503 B2
(45) Date of Patent: Aug. 19, 2008

(54) CONTROL INTERFACE AGENT SYSTEM AND METHOD

(75) Inventor: Alexander Chernoguzov, Warrington, PA (US)

(73) Assignee: Honeywell International Inc., Morristown, NJ (US)

( * ) Notice: Subject to any disclaimer, the term of this patent is extended or adjusted under 35 U.S.C. 154(b) by 819 days.

(21) Appl. No.: 10/194,380

(22) Filed: Jul. 12, 2002

(65) Prior Publication Data

US 2004/0019623 A1  Jan. 29, 2004

(51) Int. Cl.
  *G06F 15/16* (2006.01)
(52) U.S. Cl. .................. 709/206; 709/203; 709/220; 709/223; 709/250
(58) Field of Classification Search .......... 709/206, 709/230, 250, 220, 223, 203
  See application file for complete search history.

(56) References Cited

U.S. PATENT DOCUMENTS

| | | | |
|---|---|---|---|
| 5,793,964 A | 8/1998 | Rogers et al. | 395/200.32 |
| 5,802,319 A | 9/1998 | Faulk, Jr. et al. | 395/200.79 |
| 5,923,557 A * | 7/1999 | Eidson | 700/129 |
| 5,968,116 A | 10/1999 | Day, II et al. | 709/202 |
| 5,974,135 A | 10/1999 | Breneman et al. | 379/265 |
| 6,067,559 A | 5/2000 | Allard et al. | 709/202 |
| 6,163,794 A | 12/2000 | Lange et al. | 709/202 |
| 6,192,402 B1 | 2/2001 | Iwase | 709/223 |
| 6,243,396 B1 | 6/2001 | Somers | 370/469 |
| 6,256,389 B1 | 7/2001 | Dalrymple et al. | 379/900 |
| 6,289,375 B1 | 9/2001 | Knight et al. | 709/217 |
| 6,301,557 B1 | 10/2001 | Miller et al. | 704/223 |
| 6,314,555 B1 | 11/2001 | Ndumu et al. | 717/1 |
| 6,324,564 B1 | 11/2001 | Thielke et al. | 709/202 |
| 6,330,586 B1 | 12/2001 | Yates et al. | 709/201 |
| 6,571,140 B1 * | 5/2003 | Wewalaarachchi et al. | 700/83 |
| 6,922,722 B1 * | 7/2005 | Mann et al. | 709/220 |
| 2002/0103898 A1 * | 8/2002 | Moyer et al. | 709/224 |
| 2003/0018703 A1 * | 1/2003 | Huitema | 709/202 |
| 2003/0200285 A1 * | 10/2003 | Hansen et al. | 709/220 |
| 2003/0208554 A1 * | 11/2003 | Holder | 709/217 |
| 2004/0160897 A1 * | 8/2004 | Fowler et al. | 370/241 |
| 2006/0294253 A1 * | 12/2006 | Linderman | 709/230 |

* cited by examiner

*Primary Examiner*—John Follansbee
*Assistant Examiner*—Nghi V Tran
(74) *Attorney, Agent, or Firm*—Ohlandt, Greeley, Ruggiero & Perle, LLP

(57) ABSTRACT

A control system that integrates an native control system and a non-native control system is disclosed. Data is exchanged between the two systems via a gateway interface device. Control interface objects are run on the gateway interface device to provide the exchange of data. The control interface agent configuration is based on the control connections of a native device and a non-native device.

10 Claims, 2 Drawing Sheets

CONTROL INTERFACE AGENT SYSTEM AND METHOD

FIELD OF THE INVENTION

This invention relates to a system and method for communicating between native and non-native devices in a control system and, more particularly, to a system and method that facilitates such communication with control interface agents.

BACKGROUND OF THE INVENTION

A process is often controlled by a control system that includes a native control system and a non-native control system. In such a system, there is a need for communication between the devices of the native control system and the devices of the non-native control system. For example, a part of the process may require that an intelligent valve in the non-native control system be actuated based on a temperature monitored by a temperature sensor in the native control system. A control processor in the native control system controls this part of the process by gathering the temperature data, processing the data according to a control program and communicating a control signal for the valve of the non-native control system.

The communication of this control signal to the non-native intelligent valve is not a simple matter, as the non-native control system differs from the native control system in several ways, such as functionality of non-native devices, variety of control programs residing therein, data formats for communication and the like. A possible solution might involve the use of programs that image the functionality of the control programs executing in the non-native devices. This possible solution would be rigid, as it would require as many program objects as there are non-native devices multiplied by the number of unique control programs per device. Such program objects would also lack any support for customized-function non-native devices.

There is a need for a simple and flexible communication system and method for communicating signals or data between native and non-native control systems.

SUMMARY OF THE INVENTION

A method of the present invention controls a transfer of data between a native control system and a non-native control system by configuring a first control interface agent. The first control interface agent is based on control connections of a first and second devices. The first control interface agent is transferred to a gateway interface device that provides a connectivity between the control connections of the first and second devices.

According to one aspect of the method of the present invention, the first device is disposed in the non-native system and the second device is disposed in the native system. The second device in one embodiment is a control processor that processes data provided from the first device and provides output control data to a third device. According to an aspect of this embodiment, the third device is disposed in the non-native system. A second control interface agent is configured and transferred to the gateway interface device to provide an additional connectivity between the processor and the third device.

According to a second aspect of the method of the present invention, the first control interface agent is further configured to translate a status expressed in a native language to a non-native language or vice versa, the status being provided by one of the first and second devices.

According to another aspect of the method of the present invention, a second control interface is also provided. The first control interface agent is further configured to translate a first status expressed in a non-native language into a native language. The second control interface agent is further configured to translate a second status expressed in a native language into a non-native language. The first and second devices provide said first and second status, respectively.

A computer of the present invention provides control of an integrated system that includes a native control system and a non-native control system. The computer comprises means for configuring a control interface agent that is based on control connections of a first device and a second device. The computer also includes means for transferring the control interface agent to a gateway interface device that provides a connectivity between the control connections of the first device and the second device.

According to an aspect of the computer of the present invention, the control interface agent is further configured to translate a status expressed in a native language to a non-native language or vice versa, the status being provided by one of the first and second devices.

According to another aspect of the computer of the present invention, the control interface agent is an input agent or an output agent. In either case the control interface agent can provide an interface between a non-native device and either a native device or another non-native device.

According to the present invention, a gateway interface device provides an interface between a native system and a non-native system in an integrated control system. The gateway device comprises a control interface agent that provides a connectivity between the native system and the non-native system and that translates a status expressed in a native language to a non-native language or vice versa.

According to one aspect of the gateway device of the present invention, the control interface agent is either an input agent or an output agent. In either case, the control interface agent can provide an interface between a first non-native device either a native device or another non-native device.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
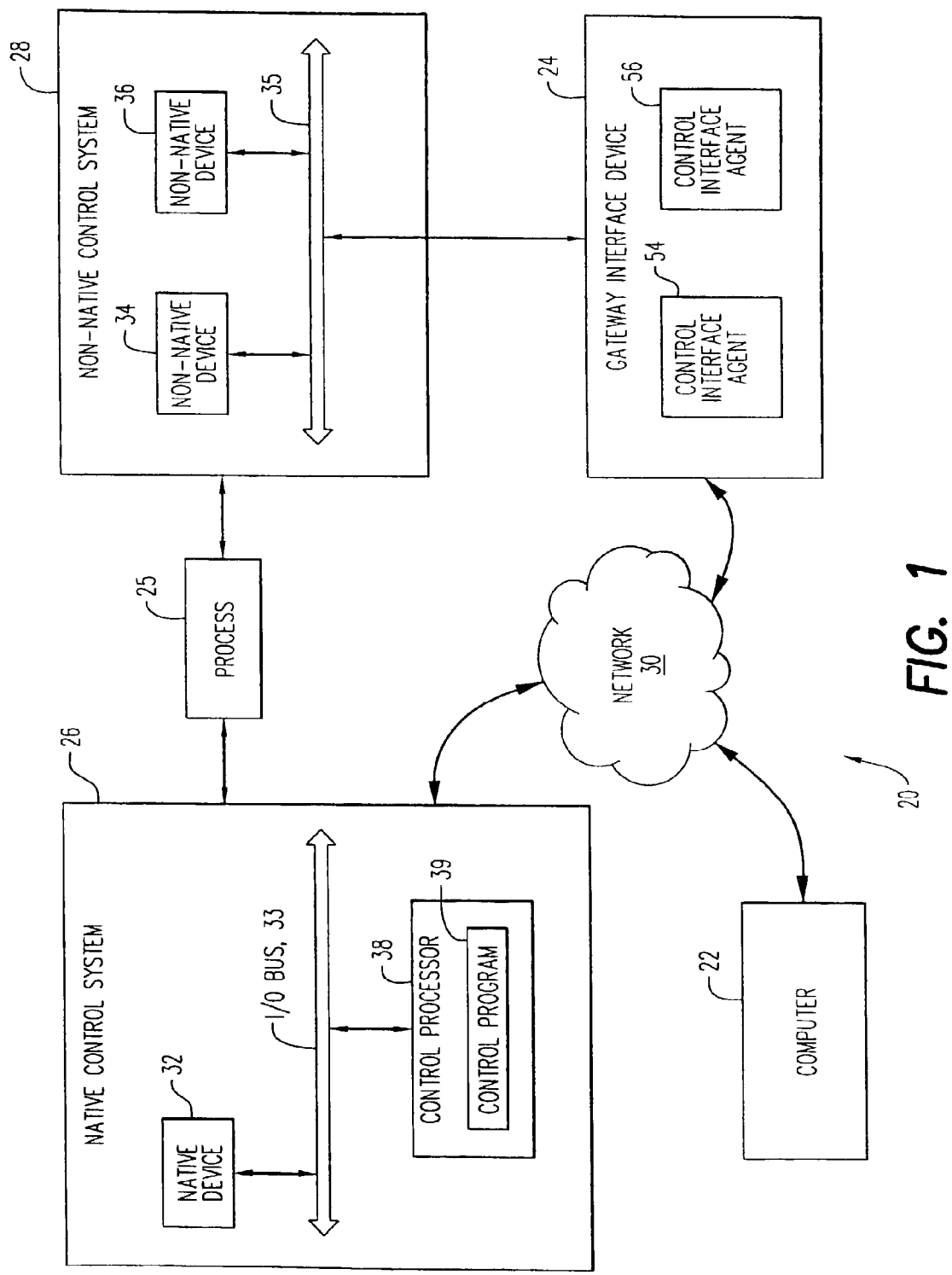
FIG. 1 is a block diagram of a control system in which the control interface system and method of the present invention can be used.

Referring to FIG. 1, a control system 20 includes a computer 22, a gateway interface device 24, a native control system 26, a non-native control system 28 and a network 30. Computer 22 is interconnected with native control system 26 and gateway interface device 24 via network 30. Gateway interface device 24 is also directly interconnected with non-native control system 28. It should be apparent to those skilled in the art that gateway interface device 24 and non-native system 28 can alternatively be interconnected via network 30.

Native control system 26 includes one or more native devices 32 (shown as one, by way of example) that monitor and/or control a process 25. Native control system 26 also includes a control processor 38 that is interconnected with native device 32 via an input/output (I/O) BUS 33. Control processor 38 is also interconnected with computer 22 and gateway interface device 24 via network 30. Control processor 38 includes a control program 39.

Non-native control system 34 includes one or more non-native devices 34 and 36 (shown as two, by way of example) that monitor and/or control the same process as monitored and controlled by native control system 26. Non-native devices 34 and 36 are interconnected via a non-native BUS 35.

Computer 22 may be a single computer or a plurality of computers interconnected via network 30. Network 30 may be any suitable wired or wireless communication network and may include the Internet, an Intranet, the public telephone system and the like.

Gateway interface device 24 may be any suitable interface device that includes a processor, a memory, an I/O unit for communication with non-native control system via non-native BUS 35 and a communication unit for communication with native control system 26 and computer 22 via network 30. Gateway interface device 24 includes one or more control interface agents 54 and 56 (two control interface agents are shown by way of example).

Native devices 32 and non-native devices 34 and 36 may be any suitable devices that monitor or control process 25, such as temperature sensors, flow rate sensors, valves, pumps, electrical switches, and the like.

Control processor 38 may be any control processor that has a processor, a memory, an I/O unit for communications via I/O BUS with native devices 32 and a communications unit for communications via network 30. For example, if network 30 is the Internet, native device 32 has a browser capability for Internet communications. Similarly, computer 22 and gateway interface device 24 would be equipped with Internet capability to serve files and/or otherwise communicate via the Internet.

Figure 2:
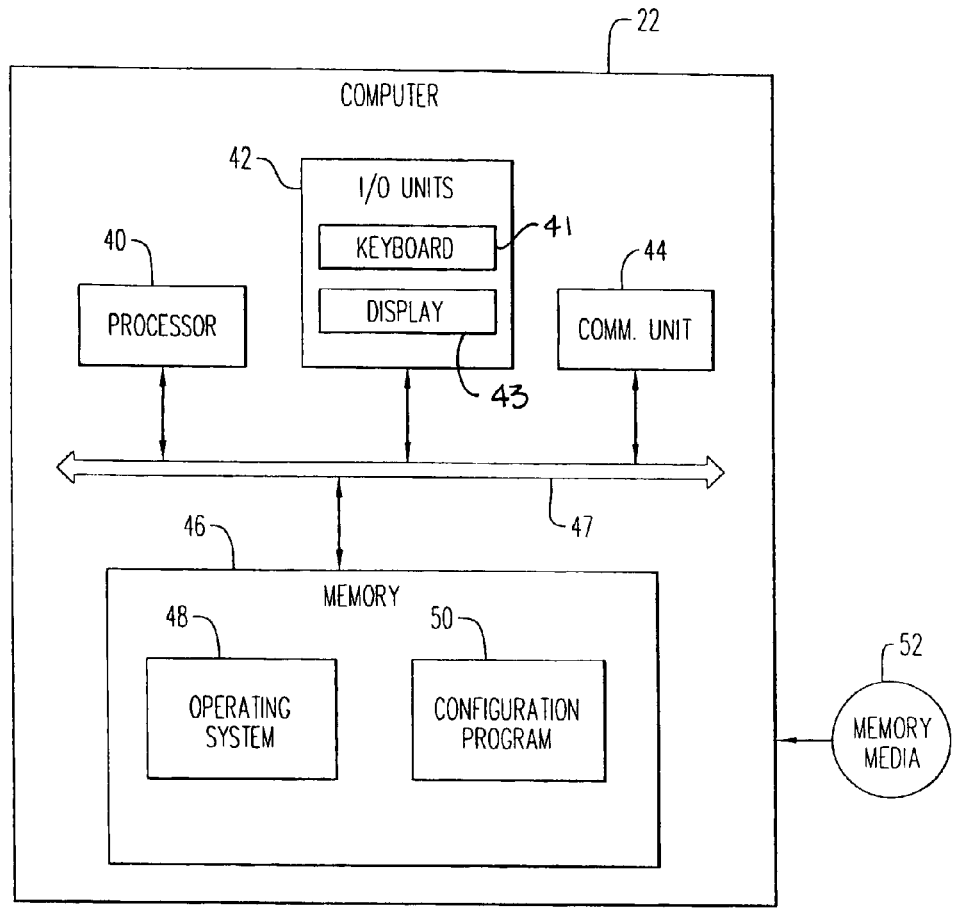
FIG. 2 is a block diagram of the computer of the FIG. 1 control system.

Referring to FIG. 2, computer 22 includes a processor 40, an input/output (I/O) unit 42, a communications unit 44, a memory 46 and a BUS 47. Bus 47 interconnects processor 40, I/O unit 42, communications unit 44 and memory 46. Memory 46 includes an operating system 48 and a configuration program 50. Operating system 48 controls processor 40 to execute configuration program 50 to configure control agents for the exchange of data between native control system 26 and non-native control system 28. A memory media 52 (e.g., a disk) contains a copy of operating system 48, configuration program 50 or other software, which can be loaded into memory 46. Communications unit 44 includes the capability to communicate via network 30.

Configuration program 50, when run, causes operating system 48 to operate processor 40 to configure control program 39 for one or more operations of process 25. The operations of process 25 may be specified by a user via I/O unit 42. For example, I/O unit 42 may include a keyboard 41 a display 43 and/or a mouse (not shown) for entry of the operations. A typical control loop includes an input operation, a control operation and an output operation. In native control system 26, control processor 38 runs the program for the input, control and output operations for native control devices 32.

The non-native control devices 34 and 36 tend to have more intelligence than native control devices 32. That is, non-native control devices 34 and 36 act as mini-controllers, in the sense that they are capable of running input and/or output operations, or possibly control operations. However, in accordance with the system and method of the present invention, the control operation is run as control program 39 in control processor 38 for native control devices 32 as well as for non-native control devices 34 and 36.

Configuration program 50 also configures control interface agents for the non-native devices of non-native control system 28, such as control interface agents 54 and 56, for any communications with native control system 26 that may be required by control program 39. The control interface agents are configured by configuration program 50 on the basis that native control system 26 and non-native control system 28 communicate via control data flow connections. Configuring control interface agents based on control data flow connections considerably reduces the number of objects required to integrate native control system 26 and non-native control system 28. The control interface agent is a software entity that provides necessary control data flow mapping on a connection basis.

Only a finite number of control interface agents is required to integrate the non-native control system into the native control system. Since control agents map data flow connections from one system to another, only as many control agents are needed as there are different connection types. A typical control system has a small number of connection types, namely input and output connections, that can be further divided into categories by type of data handled.

The aforementioned possible solution based on imaging of non-native control programs would require a different object for each control program. Since non-native devices may be procured from different vendors and with different functionality, the number of objects required could be very high. To manage this situation, only a selected number of non-native devices and their respective control programs could be supported by the possible solution. Extension to support new non-native devices would be costly and time consuming.

Configuration program 50 creates and configures control objects, such as applications or parts thereof, that are required for the input or output operations necessary to the control operation of control program 39. Control interface agents are classified as having input or output functionality. An input agent pulls data from a non-native device and an output agent provides data flow to a non-native device. Control interface agents can be further classified by the type of data handled. Typical control systems have two types of data that participate in control connections, namely analog data with status and digital data with status.

Configuration program 50 may also impart to a control interface agent an intimate knowledge of the control semantics of both native control system 26 and non-native control system 28, particularly for handling status interpretation. For example, status from non-native control system 28 carries a lot of information concerning cascade control operations. For example, the status may contain initialization acknowledgement, or request to initiate fail-safe behavior, or indicate that a value is bad or manually substituted. Native and non-native systems may have different semantics for these operations. Control interface agents 54 and 56 assure that native system 26 and non-native system 28 can deal with control behavior that each can understand. The control interface agents 54 and 56 perform translation of the status information exchanged between the two systems.

By way of example, the control interface agent system and method of the present invention will be described for the case where process 25 is for the control of a burner. For this example, non-native device 34 is assumed to be a temperature sensor that senses temperature of the combustion chamber and non-native device 36 is assumed to be an adjustable valve that controls the flow rate of fuel to the burner. The user operates keyboard 41 and display 43 to specify that non-native device 34 senses temperature to provide a temperature signal or data to control processor 39, which is to respond to the temperature signal to regulate fuel flow by adjusting non-native valve device 36.

Figure 3:
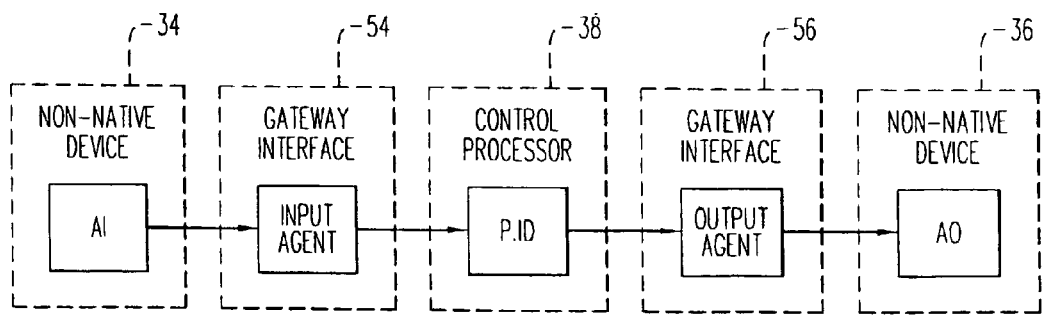
FIG. 3 depicts a control loop of the control system of FIG. 1.

Referring to FIGS. 2 and 3, configuration program 50 is then run. It causes processor 40 to present on display 43 a graphical image 60 of a functional block flow of data from non-native device 34 to control processor 39 and then to non-native device 36. The user can then make changes as necessary. When the user is finished, approval can be signaled as by operation of keyboard 41, clicking a mouse cursor on a button presented on display 43 or other input technique or device.

Configuration program 50 then assembles the program code for control program 39 and downloads such, program code to control processor 38. Configuration program 50 also configures control interface agent 54 as an input agent and control interface agent 56 as an output agent and downloads such agents to gateway interface device 24.

Although there are many possible operational scenarios, the following two operational sequences are described herein by way of example. In the first example, non-native input device 34 signals that a temperature value is bad due to a miscalibration. Input control interface object 54 translates "bad" from non-native to native language. Control program 39 (FIG. 1) executing in control processor 38 takes an appropriate action, e.g., stops controlling the non-native output device 36, moves the output to a fail-safe condition or signals the "bad" input value to non-native output device 36. If the latter, output control interface agent 56 translates native "bad" into non-native "bad" that non-native output device 36 can handle. Output non-native device 36 would then take appropriate action based on the bad status. For example, output non-native device 36 may have been configured by configuration program 50 to react by holding the last value or shed it to a certain fail-safe condition.

In the second example, input non-native device 34 reports its status input value reached a high limit. This "high limit" status information is translated by input control interface agent 54 into "high limit" status that is understandable to control program 39 executing in control processor 38. Control program 39 reacts, for example, not driving the output value any higher and/or possibly generating an alarm condition.

When process 25 is run, non-native device 34 provides temperature data via non-native BUS 35 to gateway interface device 24. Gateway interface device 24 runs control interface agents 54 and 56. Control interface agent 54 matches or maps the temperature data to the input connections of control processor 38 and sends the temperature data via network 30 to control processor 38. Control processor 38 runs control program 39 to provide output control data, which is sent via network 30 to gateway interface device 24. Gateway interface device 24 runs control interface agent 56 to match the output connections of control processor 38 to the input connections of non-native control device 36. Gateway interface device 24 sends the output control data to non-native device 56 via non-native BUS 35.

The present invention having been thus described with particular reference to the preferred forms thereof, it will be obvious that various changes and modifications may be made therein without departing from the spirit and scope of the present invention as defined in the appended claims.

What is claimed is:

1. A computer that is interconnected with a native control system and a non-native control system that are connected to control a process, wherein said native control system comprises a control processor interconnected with at least one native device via a native bus and wherein said non-native control system comprises first and second non-native devices connected to a non-native bus, said computer comprising:
   a configuration program that provides configuration data to said control processor to configure said control processor with a control program that when run controls and monitors said process using said at least one native device and said first and second non-native devices and responds to a signal from said first non-native device to cause said second non-native device to perform an action for control of said process and that configures a control interface agent with control data flow connections of said control processor and said first and second non-native devices for control of said process, wherein said configuration program transfers said control interface agent to a gateway interface device that is connected to said non-native bus of said non-native control system and to said control processor of said native control system via a network, wherein said control processor when running said control program controls the operation of said first and second non-native devices in the control of said process via the control data flow connections of said control interface agent, wherein said control interface agent is further configured to translate a status expressed in a native language to a non-native language and vice versa, and wherein said status is provided by one of said first and second non-native devices.

2. The computer of claim 1, wherein at least one of said first and second non-native devices has more intelligence than said native device.

3. The computer of claim 1, wherein said control interface agent is one of the group consisting of: input agent and output agent.

4. The computer of claim 1, wherein one of said control data flow connections is to said native device.

5. A method for controlling a process with a control system that comprises a computer that is interconnected with a native control system and a non-native control system that are connected to control a process, wherein said native control system comprises a control processor interconnected with a least one native device via a native bus and wherein said non-native control system comprises first and second non-native devices connected to a non-native bus, comprising:
   providing said computer with a configuration program that configures said control processor with a control program that when run controls and monitors said process using said at least one native device and said first and second non-native devices and responds to a signal from said first non-native device to cause said second non-native device to perform an action for control of said process;
   providing a control interface agent with control data flow connections between said control processor via a network and said first and second non-native devices via said non-native bus for control of said process; and
   controlling said process with said control processor running said control program to control the operation of said first and second non-native devices via the control data low connections of said control interface agent, wherein said control interface agent is provided in a gateway interface device that interconnected with said control processor of said native control system and said non-native bus of said non-native control system, wherein said control interface agent is further configured to translate a status expressed in a native language to a non-native language and vice versa, and wherein said status is provided by one of said first non-native device, second non-native device and said process controller.

6. The method of claim 5, wherein another control interface agent is transferred in said gateway interface device to provide an additional connectivity between said control processor and said second non-native device.

7. The method of claim 6, wherein said first non-native device and said second non-native device are a sensor and an actuator, respectively.

8. The method of claim 6, wherein said control interface agent is further configured to translate a first status expressed in a non-native language into a native language, wherein said other control interface agent is further configured to translate a second status expressed in a native language into a non-native language, and wherein said first and second non-native devices provide said first and second status, respectively.

9. The method of claim 5, wherein at least one of said first and second non-native devices has more intelligence than said native device.

10. The method of claim 5, wherein said control processor processes data provided by said first non-native device and provides output control data to said second non-native device.

* * * * *